(12) United States Patent
Bryant (10) Patent No.: US 7,868,932 B2
(45) Date of Patent: Jan. 11, 2011

(54) SYSTEM AND METHOD FOR FORMING A BORDER PRINT

(75) Inventor: Steven M. Bryant, Holly, NY (US)

(73) Assignee: Eastman Kodak Company, Rochester, NY (US)

( * ) Notice: Subject to any disclaimer, the term of this patent is extended or adjusted under 35 U.S.C. 154(b) by 1091 days.

(21) Appl. No.: 11/217,859

(22) Filed: Sep. 1, 2005

(65) Prior Publication Data

US 2007/0047012 A1 Mar. 1, 2007

(51) Int. Cl.
*H04N 5/262* (2006.01)

(52) U.S. Cl. .................................. 348/239

(58) Field of Classification Search .......... 348/207.2, 348/333.11, 333.05, 207, 211–213, 222, 348/143

See application file for complete search history.

(56) References Cited

U.S. PATENT DOCUMENTS

| | | | |
|---|---|---|---|
| 5,164,831 A | | 11/1992 | Kuchta et al. |
| 5,897,220 A * | | 4/1999 | Huang et al. ................ 396/2 |
| 6,515,704 B1 * | | 2/2003 | Sato ...................... 348/333.11 |
| 6,538,663 B2 * | | 3/2003 | Kamei ....................... 345/635 |
| 6,573,927 B2 * | | 6/2003 | Parulski et al. ............... 348/32 |
| 6,700,612 B1 * | | 3/2004 | Anderson et al. ...... 348/333.11 |
| 6,734,909 B1 * | | 5/2004 | Terane et al. ........... 348/333.05 |
| 7,148,906 B2 * | | 12/2006 | Sakashita et al. ............ 345/629 |
| 7,167,179 B2 * | | 1/2007 | Nozawa ..................... 345/473 |
| 7,330,195 B2 * | | 2/2008 | Li ............................... 345/629 |
| 2002/0149678 A1 * | | 10/2002 | Shiki et al. ............... 348/207.2 |
| 2003/0164890 A1 * | | 9/2003 | Ejima et al. .............. 348/333.1 |
| 2004/0041819 A1 * | | 3/2004 | Barry et al. .................. 345/619 |
| 2004/0100486 A1 * | | 5/2004 | Flamini et al. .............. 345/723 |
| 2004/0119726 A1 * | | 6/2004 | Li ............................... 345/629 |
| 2004/0252286 A1 * | | 12/2004 | Murray et al. ................ 355/28 |
| 2005/0012941 A1 * | | 1/2005 | Takahashi ................... 358/1.2 |
| 2005/0146746 A1 * | | 7/2005 | Parulski et al. ............ 358/1.15 |

FOREIGN PATENT DOCUMENTS

EP 0 843 461 A2 5/1998

OTHER PUBLICATIONS

International Electrotechnical Commission, IEC-61966-2-1: Multimedia Systems and Equipment; 1999.
Japan Electronic Industry Development Association; "Digital Still Camera Image File Format Standard"; JEIDA-49-1998.
CompactFlash Association; CF+ and CompactFlash Specification Revision 1.4; 1998-99.
U.S. Appl. No. 09/638,787 filed Aug. 15, 2000 to Parulski et al.

* cited by examiner

*Primary Examiner*—Lin Ye
*Assistant Examiner*—Amy Hsu
(74) *Attorney, Agent, or Firm*—David A. Novais; Kathleen Neuner Manne; Eugene I. Shkurko (57) ABSTRACT

An imaging method and system enables the use of available images to form a pictorial type border around a specific image that a user has selected to be printed. With the method and system of the invention, images from an order or from an electronic storage mechanism can be analyzed to determine which of the images are to be border images for a selected image. These images are then resized to form border images for the selected image.

7 Claims, 10 Drawing Sheets

SYSTEM AND METHOD FOR FORMING A BORDER PRINT

FIELD OF THE INVENTION

The present invention relates to an imaging method and system that enables the use of available images to form a pictorial type border around a specific image that a user has selected to be printed.

BACKGROUND OF THE INVENTION

With the advent of digital printing onto media many more opportunities are provided for expanding the options available for the format of the output of the image. For example, various enhancements and/or alterations may be provided for the printing of images, while digital printers permit a modification of the image as captured by the consumer. These modifications can provide for a print with a unique appearance that is different from the traditional 4×6 inch color print. Many of these enhancements are alterations which permit a user to modify the appearance of an image by adjusting features of the image, such as color, sharpness, contrast, etc.

SUMMARY OF THE INVENTION

The present invention provides for a system and method that is adapted to provide a user with further options in creating a print. More specifically, the present invention relates to a system and method that enables the use of available images to form a pictorial type thumbnail image border around a specific image that a user has selected to be printed.

Therefore, the present invention relates to a method of creating a print having a border, with the method comprising obtaining a plurality of digital images; selecting at least one of the plurality of digital images for printing; analyzing the plurality of digital images to determine which of the images are to be border images for the selected image; resizing the border images as thumbnail images; forming a border around the selected image with the thumbnail images; and printing the selected image with the thumbnail image border.

The present invention further relates to an arrangement for creating a print having a border, with the arrangement comprising an image capture device adapted to capture a plurality of images; and a printer adapted to print the images. The printer comprises a menu option that is adapted to permit a user to select a thumbnail border image printing option and an image from the plurality of images to be printed. The thumbnail border printing option is adapted to print the selected image with a border made of images from the plurality of images reduced to a thumbnail size.

The present invention further relates to a device adapted to create a print having a border, with the device comprising a menu section adapted to permit a user to select an image from a plurality of images for printing. The menu section includes a menu option that is adapted to permit a user to select a thumbnail border image printing option. The thumbnail border image printing option is adapted to print the selected image with a border made of images from the plurality of images reduced to a thumbnail size.

The present invention further relates to a print comprising: a main image; and a border surrounding the main image. The border comprises a plurality of reduced sized images placed adjacent each other so as to form a border around the main image.

DETAILED DESCRIPTION OF THE INVENTION

Figure 1:
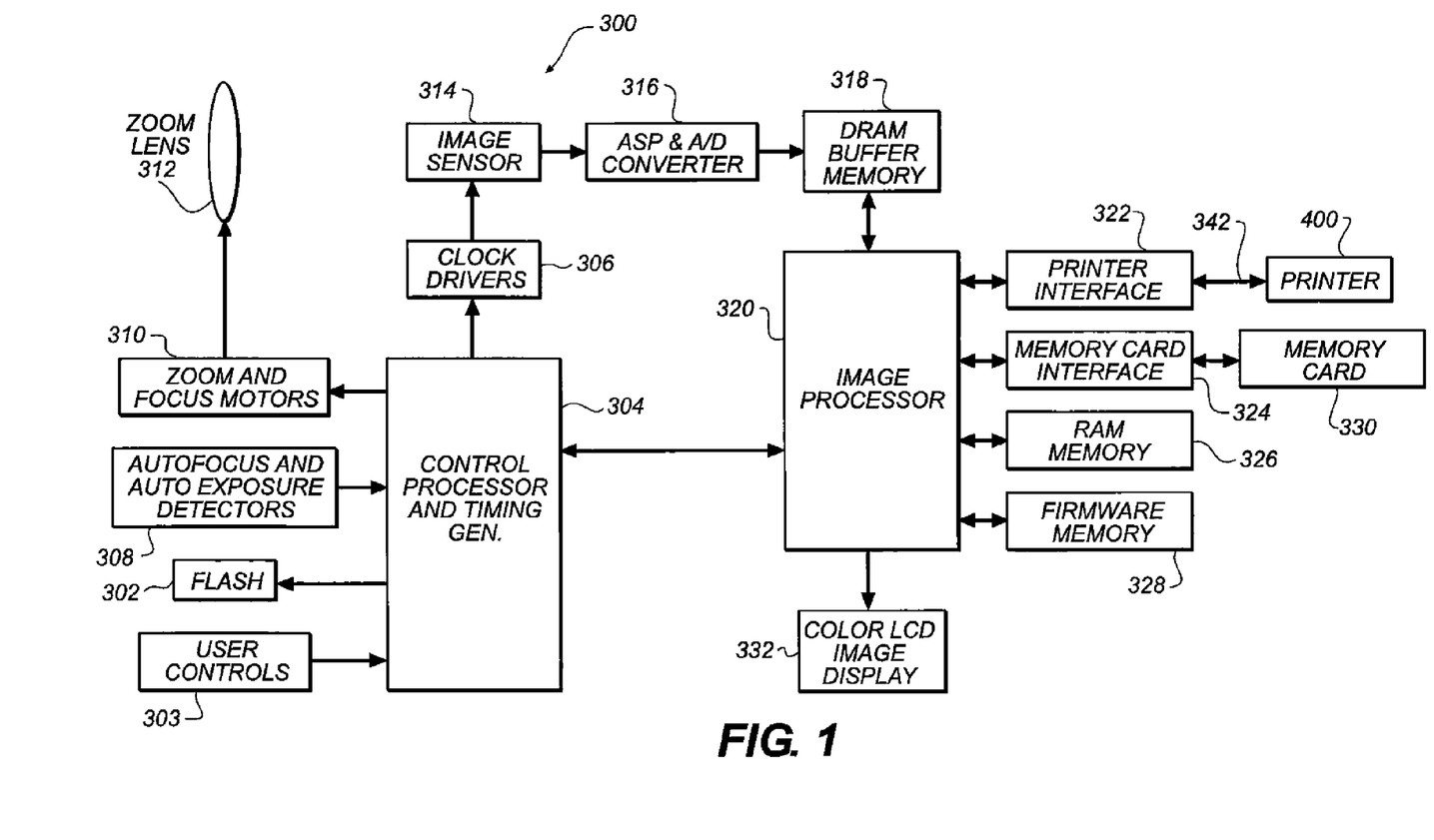
FIG. 1 is a schematic view of a digital camera that can be used in the present invention.
Figure 2:
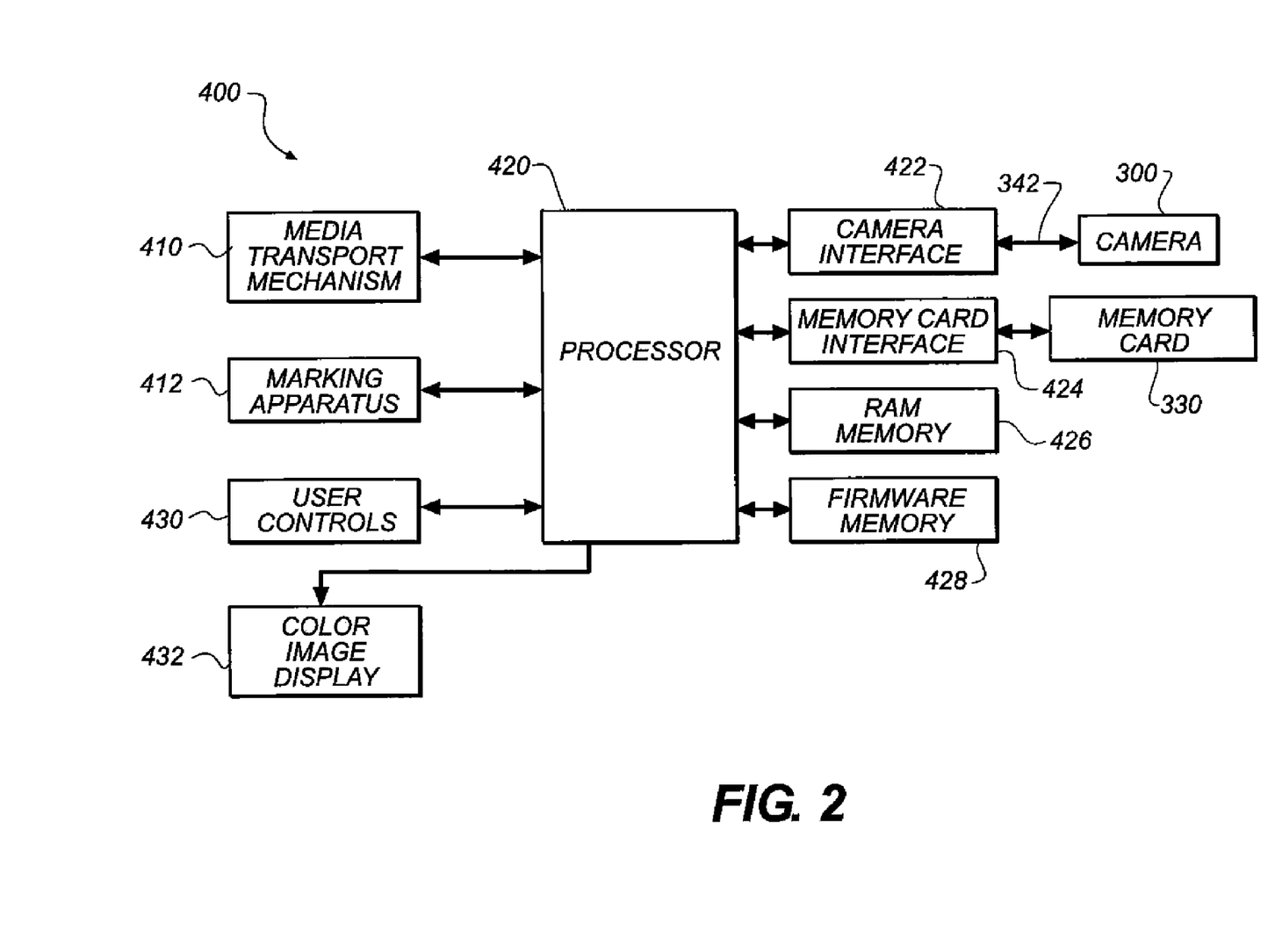
FIG. 2 is a schematic view of a printer that can be used in the present invention.

Referring now to the drawings, wherein like reference numerals represent identical or corresponding parts throughout the several views, the present invention can be practiced by way of a digital camera or a film camera, wherein prints are created at home through a home printer, at a stand-alone kiosk, at a minilab or at a wholesale lab. FIG. 1 shows an example of a digital camera 300 which can be used to captured images for printing in accordance with the present invention. Digital camera 300 can store images on a digital storage medium, such as a memory card 330 as shown in FIG. 1. A digital printer or imaging apparatus 400, shown in detail in FIG. 2 can be used to produce color hardcopy prints using a color marking apparatus 412, such as an ink jet head, and a paper transport mechanism 410. Digital printer 400 includes a digital media interface, such as a memory card interface 424 (FIG. 2.), for transferring images from memory card 330. As illustrated in FIG. 2, digital printer 400 can incorporate a graphical user interface including a color image display 432 for displaying the digital images stored on memory card 330 and user controls 430 for selecting specific images to be printed from the plurality of digital images stored on memory card 330.

Figure 3A:
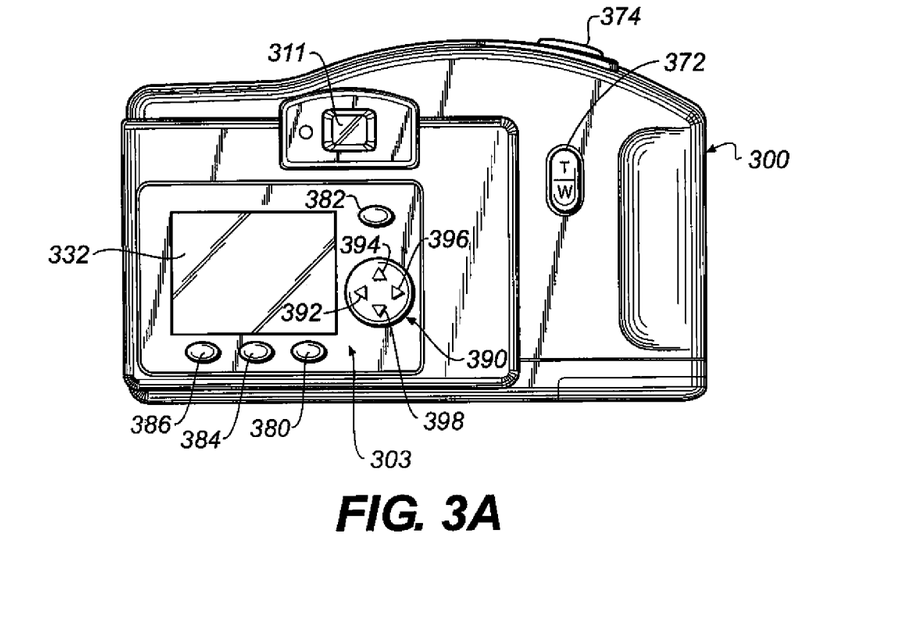
FIG. 3A is a rear view of a camera.

Referring now to FIG. 1 in detail, FIG. 1 is a block diagram showing electronic camera 300 that captures and stores digital images on a digital storage medium, such as memory card 330. FIG. 3 depicts a rear view of the appearance of electronic camera 300. Electronic camera 300 includes a zoom lens 312 having zoom and focus motor drives 310 and an adjustable aperture and shutter (not shown). The user composes the image using optical viewfinder 311 and zoom lens control switch 372 shown in FIG. 3A. Zoom lens 312 focuses light from a scene (not shown) on an image sensor 314, for example, a single-chip color CCD image sensor, using the well-known Bayer color filter pattern. Image sensor 314 is controlled by clock drivers 306. Zoom and focus motors 310 and clock drivers 306 are controlled by control signals supplied by a control processor and timing generator circuit 304. When the user depresses shutter button 374 (FIG. 3A) to take a picture, control processor and timing generator 304 receives inputs from autofocus and autoexposure detectors 308 and controls a flash 302. The analog output signal from image sensor 314 is amplified and converted to digital data by analog signal processing (ASP) and analog-to-digital (A/D) converter circuit 316. The digital data is stored in a DRAM buffer memory 318 and subsequently processed by a camera processor 320 controlled by the firmware stored in a firmware memory 328, which can be flash EPROM memory.

The processed digital image file is provided to a camera memory card interface 324 that stores the digital image file on memory card 330. Removable memory cards 330 which are described as an example in the present specification are known to those skilled in the art, and are one type of digital storage media. The memory card 330 can conform to the Compact Flash interface standard, such as described in the *CompactFlash Specification Version* 1.3, published by the CompactFlash Association, Palo Alto, Calif., Aug. 5, 1998. The removable memory card can alternately conform to the PCMCIA, Smart Media, Memory Stick, or SD memory card formats. The present invention is not limited to memory cards and it is noted that other types of digital storage media, such as magnetic hard drives, magnetic tape, or optical disks, can alternatively be used to store the digital images.

Processor 320 performs color interpolation followed by color and tone correction, in order to produce rendered sRGB image data as defined in IEC 61966-2-1 *Multimedia systems and equipment—Colour measurement and management—Part* 2-1: *Colour management—Default RGB colour space—sRGB* available from the International Electrotechnical Commission, Geneva, Switzerland. The rendered sRGB image data is then JPEG compressed and stored as a JPEG image file on memory card 330 using an JPEG/Exif version 2.1 image file as defined in *Digital Still Camera Image File Format Standard* (*Exchangeable Image File Format for Digital Still Camera: Exif*), version 2.1, JEIDA-49-1998 available from the Japan Electronic Industry Development Association, Tokyo, Japan. The JPEG/Exif image files can be utilized by many different image capable devices, such as computers and stand-alone printers.

Processor 320 also creates a "thumbnail" or reduced size image, as described in commonly assigned U.S. Pat. No. 5,164,831 "Electronic still camera providing multi-format storage of full and reduced resolution images" to Kuchta et al. The thumbnail image is stored in RAM memory 326 and supplied to a color LCD image display 332, which displays the captured image for the user to review. User controls 303 and the text, icons, and images displayed on the display 332 provide the camera graphical user interface (camera GUI). As shown in FIG. 3A, the user controls 303 include menu button 380, select button 382, capture mode button 384, review mode button 386, and cursor button 390 having left arrow button 392, up arrow button 394, right arrow button 396, and down arrow button 398. After a series of images has been taken after depressing capture mode button 384, and then repeatedly depressing shutter button 374, review mode button 386 may be pressed so that the captured images can be reviewed on color LCD image display 332.

The camera graphical user interface is controlled by the user interface portion of the firmware stored in firmware memory 328, which controls how the processor 320 responds to user controls 303 and creates the information displayed on display 332. Display 332 can be an active matrix color LCD display. Alternately, it can use other display technologies, such as organic light emitting diodes (OLEDs). Electronic camera 300 can also include a video output driver and connector (not shown) for displaying the captured images on a TV (not shown). Camera 300 may include firmware stored in firmware memory 328 to control image processor 320 to allow the user to create an image utilization file (such as a Digital Print Order Format (DPOF) file) to indicate what images are to be printed. Such a utilization file is described in commonly-assigned U.S. Pat. No. 6,573,927 issued Jun. 3, 2003 to Parulski. This image utilization file is stored on memory card 330 along with the image files.

After a series of images have been taken and stored on memory card 330, memory card 330 can be inserted into a printer memory card interface 424 in digital printer 400 as shown in FIG. 2. Alternatively, a printer interface 322 in electronic camera 300 can be used to connect to a corresponding camera interface 422 in printer 400. Connection 342 between electronic camera 300 and digital printer 400 may be, for example, an interface cable conforming to the well-know universal serial bus (USB) interface specification, the IEEE 1394 interface specification, or other cable interface specifications. Alternately, the interface may utilize a wireless interface such as the well-known IrDA (Infrared Data Association) interface or an RF (radio frequency) interface such as the well-known Bluetooth RF interface. Alternately, electronic camera 300 may include an electrical connector that directly mates with a corresponding connector on digital printer 400. This connector can be by way of an inset in the printer having a connector that permits the camera to be directed fitted or mounted on the printer, such as the Kodak Printer Dock system.

FIG. 2 is a block diagram of digital printer 400. Digital printer 400 produces digital prints (not shown) from images provided on memory card 330 or via camera interface 422 from electronic camera 300. Digital printer 400 includes a media transport mechanism 410, such as a motor-driven roller, for moving hard copy media (e.g., ink jet paper) past marking apparatus 412 (e.g., a color ink jet head) under the control of a printer processor 420. Processor 420 controls the marking apparatus 412 to provide controlled amounts of various color inks or dyes in order to produce a pictorial image on the hardcopy media. Color marking apparatus 412 may alternately use color thermal dye sublimation, color electrophotographic, or color instant technologies to produce the digital prints.

As described earlier in relation to FIG. 1, memory card 330 can conform to the Compact Flash interface standard, such as described in the *CompactFlash Specification Version* 1.3, published by the CompactFlash Association, Palo Alto, Calif., Aug. 5, 1998. The removable memory card 330 can alternately conform to the PCMCIA, Smart Media, Memory Stick, or SD memory card formats. Other types of digital storage media, such as magnetic hard drives, magnetic tape, or optical disks, can alternatively be used to store the digital images.

Figure 3B:
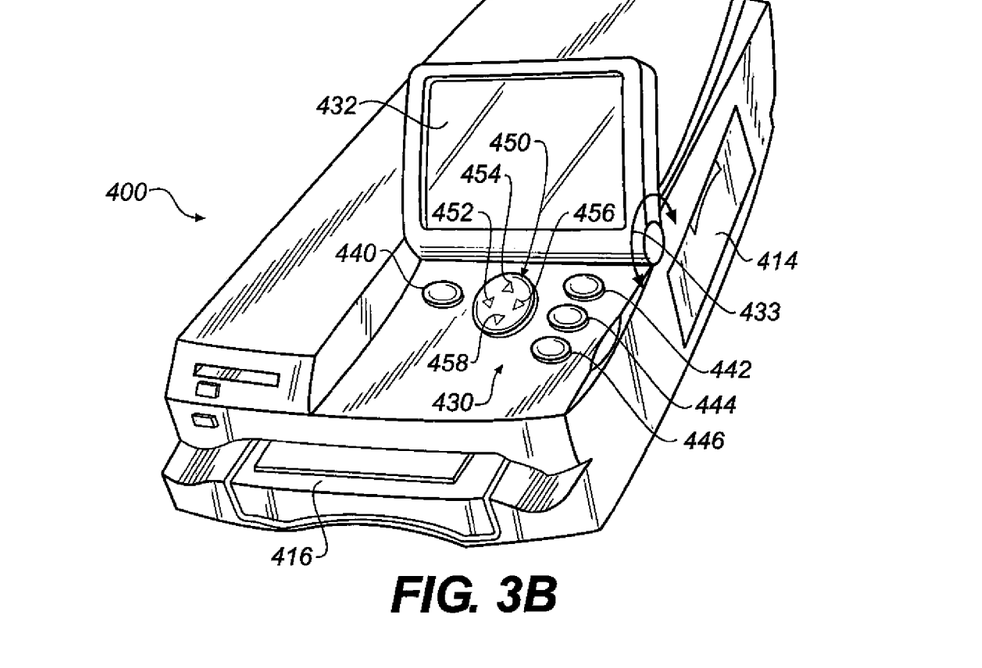
FIG. 3B is a schematic view of a printer that can be used in the present invention.

Digital printer 400 can include a color image display 432 or the display from the camera when the camera is docked onto the printer can be used as in the Kodak Printer Dock arrangement. If the printer 400 is equipped with a display as shown in FIG. 3B, the color image display 432 can be an active matrix color LCD display. Alternately, it can use other display technologies, such as organic light emitting diodes (OLEDs). As shown in FIG. 3B, digital printer 400 can be controlled by printer user controls 430. User controls 430 and the text, icons, and images displayed on color image display 432 provide the printer graphical user interface (printer GUI). User controls 430 include menu button 440, select button 442, view/return button 444, print button 446 and cursor button 450 having left arrow button 452, up arrow button 454, right arrow button 456, and down arrow button 458. The printer GUI is controlled by the user interface portion of the firmware stored in firmware memory 428, which controls how processor 420 responds to user controls 430 and creates the information displayed on color image display 432. Digital printer 400 can also include a video output driver and connector (not shown) for displaying the images on a TV (not shown).

Since the image files created by electronic camera 300 use the JPEG/Exif image format, they are JPEG compressed and must be decompressed by processor 420 in digital printer 400. Processor 420 also provides interpolation, sharpening, color correction, and half-toning to prepare the image data properly to be used by marking apparatus 412. Processor 420 is controlled by firmware stored in firmware memory 428.

Figure 4:
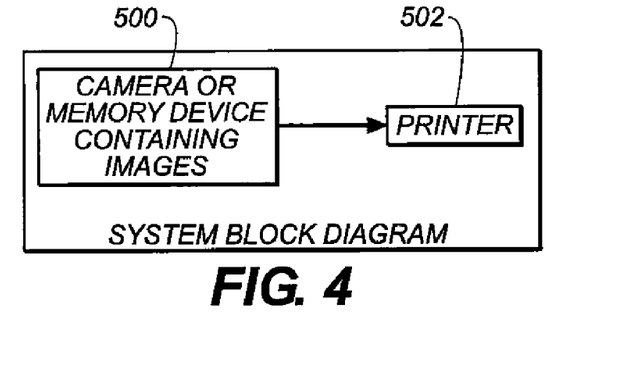
FIG. 4 is a system diagram showing an association of a camera or memory device with a printer in accordance with the invention.

FIG. 4 illustrates a schematic view of an embodiment of the present invention utilizing a digital camera and a digital printer. As illustrated in FIG. 4, a digital camera 500 such as an Imagelink digital camera can be adapted to be docked or connected via a wire or wirelessly to a printer 502 such as the Kodak Printer Dock Printer. Alternatively, instead of a camera, a memory device containing images can be connected or inserted into printer 502. In the embodiment of FIG. 4 and using a docking camera as an example, when the digital camera 500 is docked on a corresponding inset on the printer 502, the camera 500 is adapted to wake up and communicate with the printer 502. The printer 502 can then query the camera 500 for images that are present within the camera's memory store or memory card. After a list of images is created, the most current image (last image taken) is displayed on the camera's display, or optionally the display of the printer if the printer is equipped with a display. For the situation where the image is displayed on the display of the printer, the image source does not have to have a display and therefore, memory cards such as Compact Flash cards can be used.

Once the images are on the display of either the camera or the printer, a user can scroll through the images using the keys or user controls on the printer or the camera. As the user scrolls through the images, the images are displayed on the display.

The printer 502 as shown in FIG. 4 includes means such as buttons or controls to get to a menu (a menu section) of setup options for the printer. The menu is displayed on the display of the printer or camera. One of the menu options in accordance with the present invention is a thumbnail border image printing option that permits the creation of a thumbnail image border that is to be added to a selected image. If this option is enabled, each image that is selected for printing with a border will include a border made up of related images that are reduced to a small size, and more specifically, the images are reduced to thumbnail or thumb size images. Also, the selected image with the border can be previewed on the display of the camera or printer.

Figure 5:
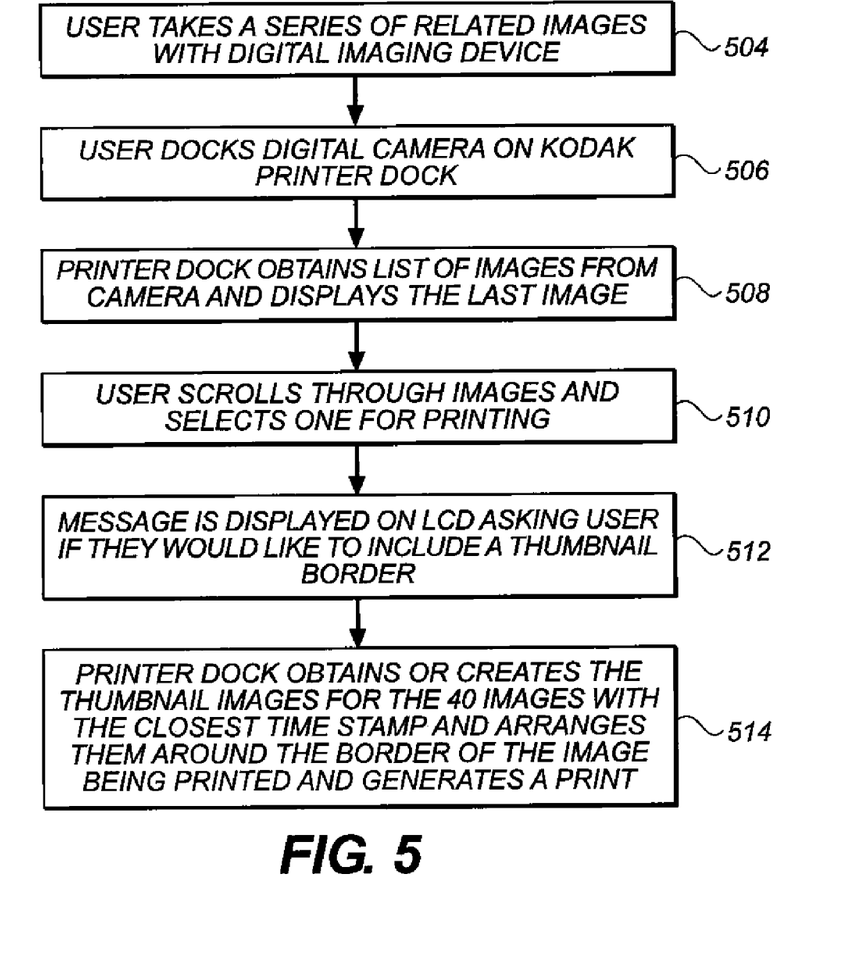
FIG. 5 is a flow diagram of a method of creating a print in accordance with the present invention.

FIG. 5 is a flow chart that illustrates an example of a method or system in accordance with the present invention utilizing a digital imaging device such as a digital camera and a dock printer. In step 504 a user takes a series of related images with the device or camera. In step 506, the user docks, connects, the device or camera with an enabled printer. In step 508, the printer obtains the list of images from the device or camera and displays the last image. Optionally at step 508, the images can be displayed on the display of the camera. In step 510, the user scrolls through the images and selects one of the images for printing. In step 512, a message is displayed on the camera or the printer LCD asking the user if they would like to include a thumbnail border (thumbnail border printing option) with their print. If the answer is no, the user can choose to print the selected image without a border. If the answer is yes, in step 514 the printer is adapted to obtain or create thumbnail images for the series of border images. In an example embodiment relative to step 514, the printer can include a processor that is adapted to automatically select images with the closest time stamp to each other and/or the image selected for printing as the thumbnail border images. Therefore, the thumbnail border images could be composed of the image selected for printing or other images in an order or file. The printer can then automatically arrange the thumbnail border images with the closest time stamp around the border of the image selected for printing to generate a print with a thumbnail image border as shown in FIG. 6.

Figure 6:
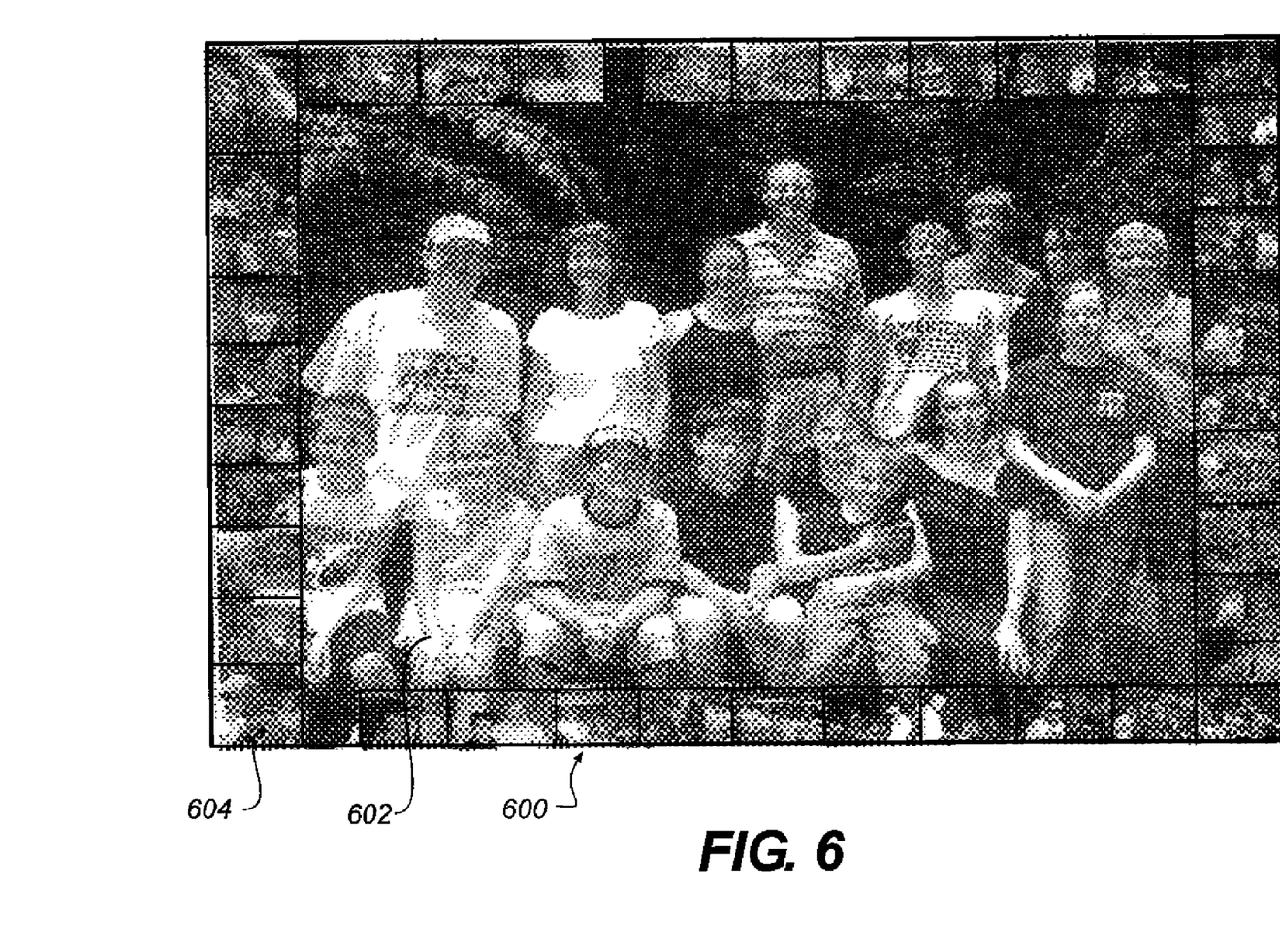
FIG. 6 is a bordered print in accordance with the present invention.

More specifically, as shown in FIG. 6, a print having a thumbnail image border is identified by reference numeral 600. The print 600 includes a main image 602 which is selected by a user, or automatically selected by a service provider or software in the printer to be printed as a bordered print. Around main image 602 are a plurality of thumbnail border images 604 which are laid out in the form of a pictorial border around the main image. Methods for selecting the thumbnail images in addition to using a time stamp will be described below. That is, although the embodiment described above sets forth the concept of automatically selecting those images with the closest time stamp as candidates to form the border images 604, the present invention is not limited to this embodiment. As a further option, the step of obtaining and creating the border images can include the process of automatically selecting those images from a customer order or memory card that include faces utilizing well-known face detection algorithms. In this scenario, the border images that form the border around the selected or main image can each include a face.

In a further embodiment, if the selected or main image includes a single face, the method can include the process of locating the face of the single image and creating a thumbnail border that includes variations of the face as the thumbnail border images. In creating the variations of the face, fun effects such as cartoon effects, sepia tones, etc., can be applied to the faces of the thumbnail images. As a variation of this embodiment, the thumbnail border images can be reduced versions of the selected or main image.

In a further embodiment, the invention can be practiced using a video. In this case, the primary or main image and more specifically, the image selected to be printed can be an image at the start of the video, or an image appearing elsewhere in the video. The thumbnail images used to compose the thumbnail border can be comprised of spaced snap shots from the video.

In a still further embodiment, smart placement of the thumbnail images for the thumbnail border can be utilized in composing the thumbnail border. More specifically, smart placement of the thumbnail images would involve analyzing the selected or main image that is to be printed utilizing known image analysis algorithms, and placing light thumbnail images adjacent to dark areas of the selected image that are near the border, and placing dark thumbnail images next to light areas of the selected image that are near the border. Another variation is smart placement of thumbnails by analyzing the image for background or blank areas and placing the thumbnails in those areas instead of as a border. This would create a collage effect in the image.

As still further options in accordance with the present invention, the images for the thumbnail border could be selected such that the placement of the thumbnail images in a border around the selected image could create different patterns. Further, intervening designs can be placed between groups of thumbnail images that form the border. Also, the thumbnail border images could be selected and located based on the contrast of the selected or main image to be printed or the dominant colors of the selected or main image to be printed.

In a preferred embodiment of the method and system of the invention, the print is a 4"×6" print. The thumbnail images would be approximately ½". The resulting image would then be approximately 3"×5" with a ½ border of thumbnail images all the way around.

Also, in an example embodiment, the selection of the thumbnail images can be done automatically without user intervention once the user selects the thumbnail border option for printing and selects the main image. The primary mechanism used to determine which images to use to make up the border images is to use time stamps on the image files which are part of the customer order on a memory card. Using the time stamp on the file the nearest 40 images in time can be automatically selected.

An alternative mechanism for the automatic thumbnail image selection would be to use any file system organization that the user may have implemented. For files organized in folders, the related files to select could be those in the same folder as the main image selected for printing or in nearby folders on the same branch of a file tree.

The above has been described utilizing the combination of a digital camera docked with, attached to and/or communicating with a printer. The present invention can also be practiced on a computer. That is, a user can load the images into a computer having software enabled to select images for the thumbnail image border and automatically create the thumbnail image border. Also, a user can preview the images and the selected image with a border on the display of the computer. Thereafter, a user can send the image to a home printer, or send the image via the Internet for printing by an on-line or retail service provider.

As a further option, the present invention can be practiced utilizing an imaging device such as a stand-alone customer operated kiosk. An example of such a kiosk is a Picture Maker™ kiosk produced by Eastman Kodak Company. In a still further option, the reviewing and selecting process can be done on a digital capture device, along with a menu option to select a thumbnail border print, before connecting to the printer.

Figure 7:
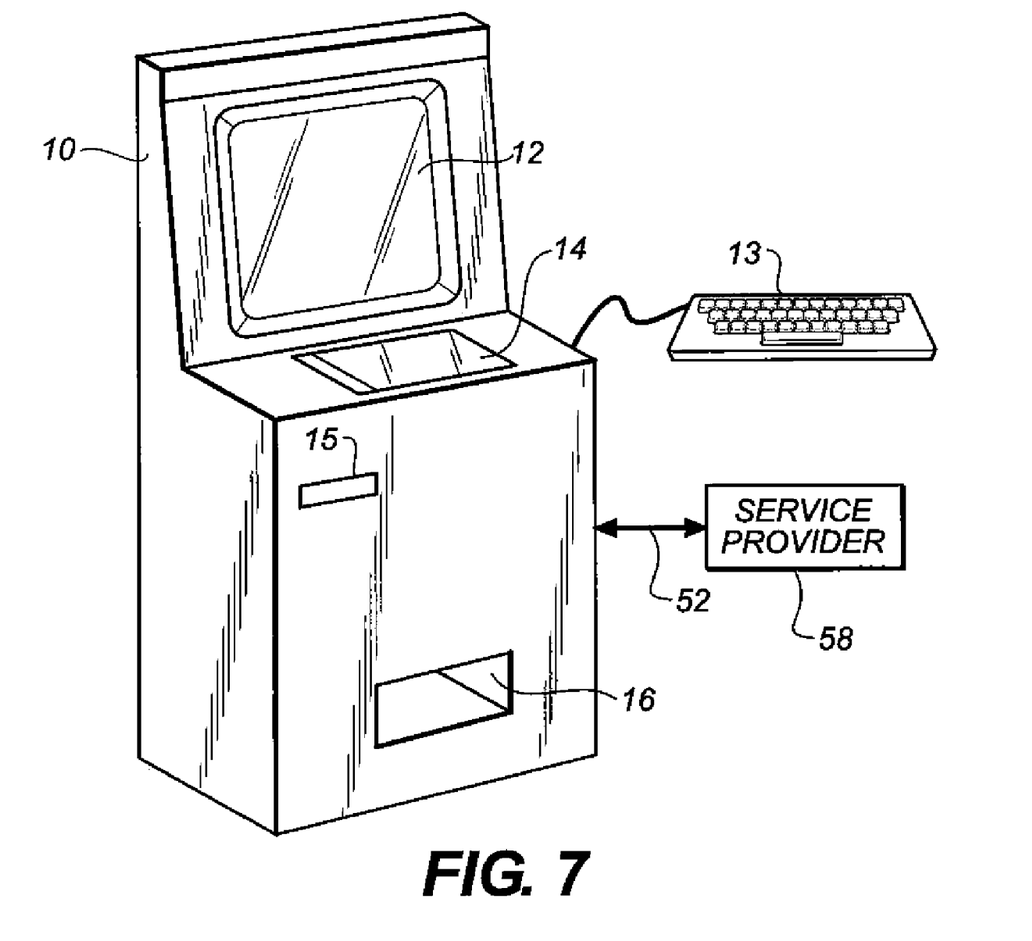
FIG. 7 is a view of a stand-alone kiosk that can be used in the present invention.
Figure 8:
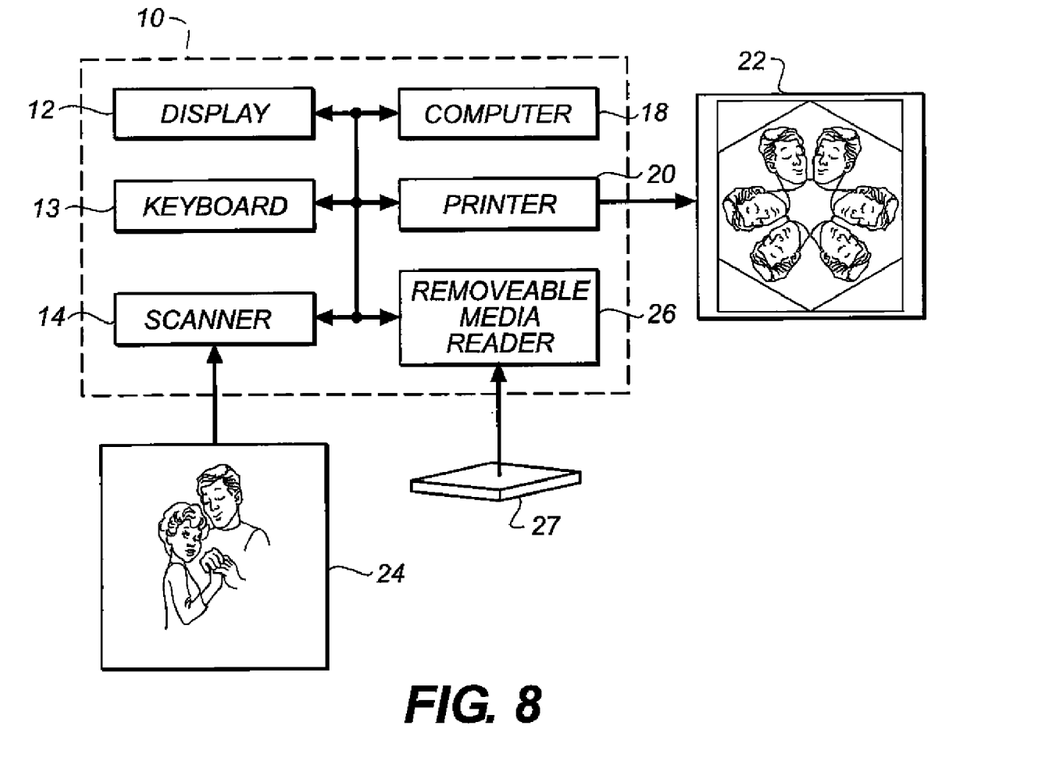
FIG. 8 is a schematic view of features of the kiosk of FIG. 7.
Figure 9:
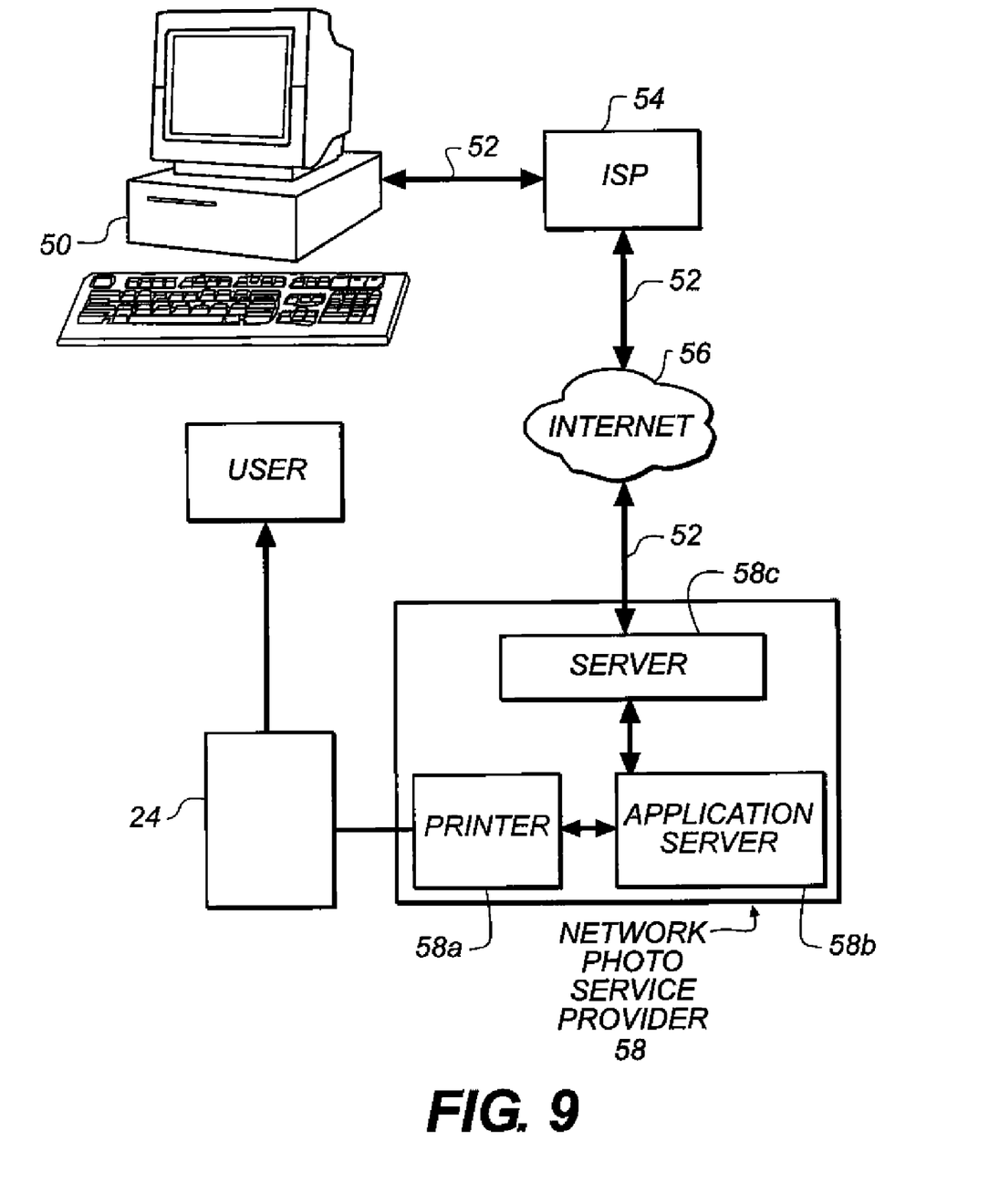
FIG. 9 is a schematic view of a further system associated with the Internet that can be used in the present invention.

Referring now to FIGS. 7 through 9, an imaging device such as kiosk 10, is generally illustrated in FIG. 7. Kiosk 10 includes a color display 12 for presenting information to a user. Color display 12 can be a touch screen display, whereby a user can provide information and data to kiosk 10, or a keyboard 13 may be employed to provide information and data. A scanner 14 can be provided for receiving a user-supplied visual image and converting the visual image into digital form. Alternatively, an input port 15 can be provided for receiving a user-supplied visual image in digital form from a removable media, such as from a memory card, floppy disk, compact disc, PictureCD, or the like. Kiosk 10 can optionally include a delivery section 16 for controlling the delivery of a medium, for example, a hardcopy print. Delivery section 16 is illustrated in FIG. 2 as an opening in kiosk 10.

FIG. 8 generally shows a diagram of included functions of kiosk 10. As illustrated, kiosk 10 includes keyboard 13 for entering information/data into a computer 18. Computer 18 typically manages the flow of information and functionality of the components of kiosk 10. Kiosk 10 can optionally include a printer 20. Printer 20 responds to commands of computer 18 for forming an image on a medium such as thermal or ink-jet paper. An example of an output image is illustrated in FIG. 8 at 22 which was formed from a user-supplied visual image 24. As described above, another method of receiving user-supplied visual image 24 is illustrated by a removable media reader/writer 26 for receiving removable media 27, for example, a memory card, floppy disk, compact disc, PictureCD, or other form of removable media used in transferring digital files, or for transferring (i.e., writing) a fulfillment order (alone or in combination with the corresponding digital image) to removable media 27, whereby the removable media 27 is delivered/transferred to the photofinishing laboratory for processing of the fulfillment order.

It may be desired to transmit a fulfillment order from kiosk 10 to a service provider from which the service provider can store, print, the digital image. For example, if a consumer's fulfillment order includes a request for prints and kiosk 10 does not include a printer, the digital image can be transmitted to a service provider for fulfilling the fulfillment order. Accordingly, a communications network, generally shown in FIG. 7 at 52, provides a communication network for transmitting an image to a service provider 58. If kiosk 10 is a computer, such as a home or personal computer, a service provider can also be employed. For example, referring to FIG. 9, when employing a service provider, a computer 50, can be used as imaging device 10 for viewing the user's image 24. Communication network 52 for transmitting image 24 can be by means of an Internet service provider (ISP) 54 and the Internet 56 to a service provider 58. As shown in FIG. 9, service provider 58 can include a printer 58a, an application server 58b and a service 58c.

Using kiosk 10, at least one digital image is accessed and displayed on display 12. Access and display of the images is accomplished using methods known to those skilled in the art. For example, as discussed above, means for accessing the images can be accomplished by scanning a hardcopy print or employing input port 15 to receive removable media 27. Display 12 can provide instructions to the user for accessing the digital image.

Therefore, in using a kiosk 10 in accordance with the present invention, the customer would enter his/her images onto the kiosk 10 and select a thumbnail border print option from a menu of options. At this point a user can select an image to print as a thumbnail border print. The software in the kiosk 10 can be adapted to automatically select from the remaining images of the customer's order, those images that are to compose the thumbnail border images. The selection of the border images can be based on the criteria and/or analysis described above (for example, fine stamp, file storage, face detection, color analysis, etc.) with regard to the home printer. As a further option, the customer can manually choose and compose those images that are to makeup the thumbnail border images. This display on the kiosk also permits a user to preview the selected image with the border. After the customer has made his/her selections, he/she can proceed to print the selected image with the thumbnail border image at the kiosk 10, or send the image to a remote location for printing.

Figure 10:
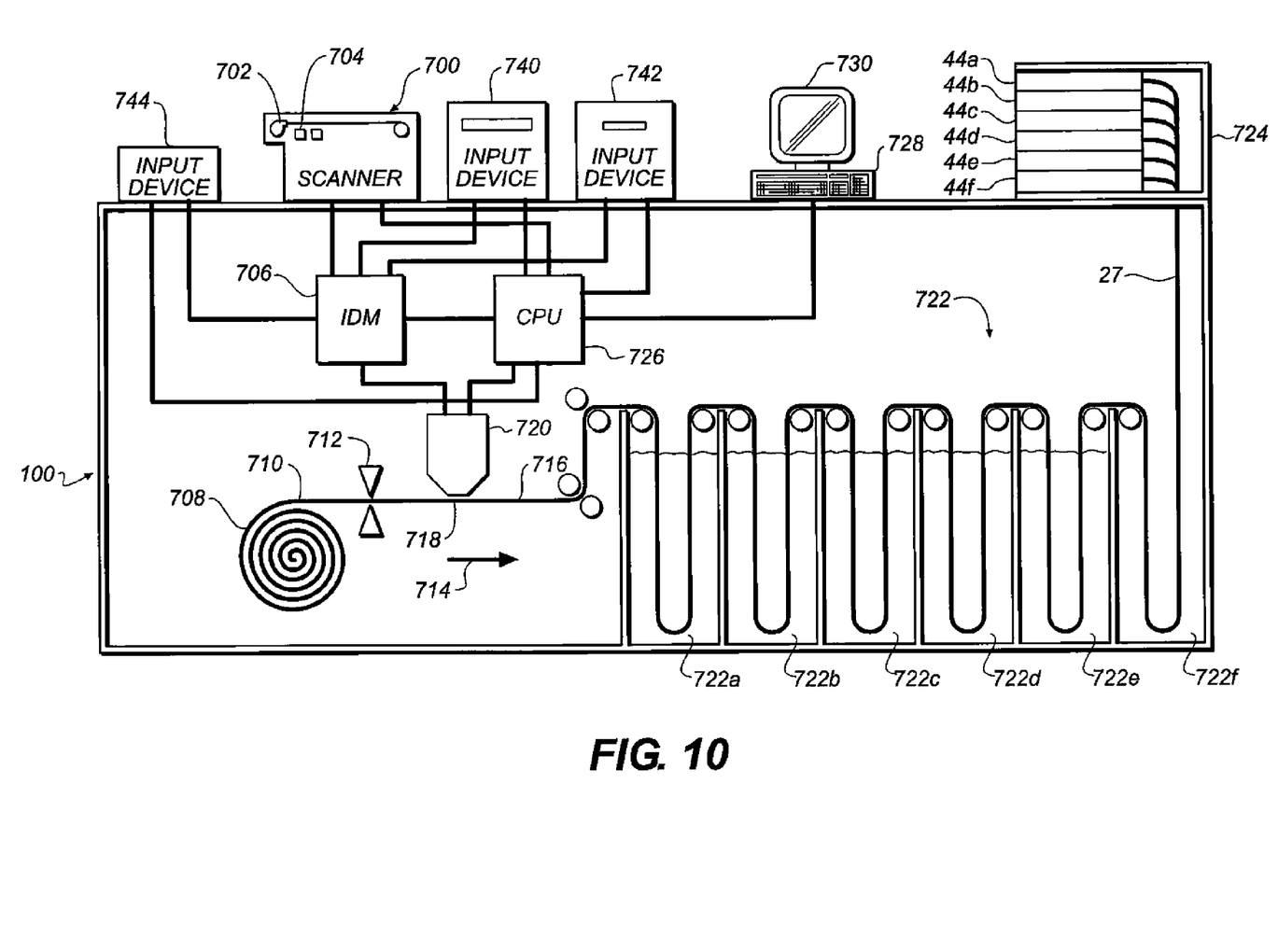
FIG. 10 is a schematic view of a lab type apparatus which can be used in the present invention.

It is noted that the present invention can also be practiced utilizing a traditional photofinishing system such as a minilab or wholesale lab and a film camera that captures images on photographic film. FIG. 10 illustrates an example of an apparatus 100 that is adapted to print digital images onto photosensitive media (material). In particular, apparatus 100 is of the type commonly referred to as a photographic minilab. As is typical of most minilabs, customer image orders are provided for printing of images onto a photosensitive media. A customer image order, for the purpose of the present invention, can be a roll of developed photographic film, a digital record file of a printing order containing a plurality of images thereon, or an order received via the Internet. In a particular embodiment illustrated, apparatus 100 includes a scanner 700 that is designed to receive and scan a roll of developed film 702. The roll of developed film 702 is transported past sensor 704 in scanner 700 which scans the images on the film so as to provide a digital record of the customer images. Scanner 700 scans at a resolution sufficient to provide the desired quality prints. The digital record of the image is then forwarded to an image data manager (IDM) 706 wherein the images are manipulated as preprogrammed. In the embodiment illustrated, IDM 706 comprises a computer (microprocessor) used for manipulation of the digital images contained in the digital record file. IDM 706 also includes a memory for storing of the digital record of the customer image order.

Apparatus 100 further includes a supply roll 708 containing a web of photosensitive media 710, which in the present invention comprises photographic paper. A cutting mechanism 712 is provided for cutting the web of photosensitive media into individual cut sheets. Mechanism 712 may cut the web into sheets having any desired lengths. Appropriate transport mechanisms, not shown, are provided for advancing of the cut sheets in the direction indicated by arrow 714 along processing path 716 through apparatus 100. In particular, the cut sheets are transported from cutting mechanism 712 to an exposure gate 718 where a digital printer 720 exposes the individual images of the customer image order onto individual cut sheets, respectively, as they pass exposure gate 718. In the particular embodiment illustrated, digital printer 720 can be a printer which scans a light containing image data onto cut sheets as they move in the direction indicated by arrow 714 pass exposure gate 718. Since printer 720 is a digital printer and cutting mechanism 712 may cut the web of photosensitive media 708 into any desired length sheets, the images produced on the cut sheets may be provided in a variety of different format sizes being constrained only by the printing capabilities of printer 720 and the width of the web of photosensitive media 708. It is also to be understood that printer 720 may be any appropriate digital printer, for example, a CRT printer, an LED printer, an LCD printer, a laser printer or other types of digital printers that can print onto a photosensitive media. In the embodiment illustrated, web of photosensitive media 710 comprises photographic paper, however, the medium may comprise other media capable of being printed on by a digital printer. In the embodiment illustrated, the web of photosensitive media is first cut into individual cut sheets prior to printing, however, the present invention is not so limited. The digital images may be first printed on the web of photosensitive media 710 which at some later time before or after processing, is to be cut into individual cut sheets forming individual prints, with each print being representative of a print of a single customer order.

As is typical with minilabs, apparatus 100 is further provided with a processing section 722 wherein the cut sheets, after leaving exposure gate 718, are passed therethrough for development as is customarily done in such devices. For the particular embodiment illustrated, the cut sheets are passed through a developer station 722a containing a developer solution, a bleach/fix station 722b containing a bleach/fix solution, a plurality of wash stations 722c, 722d, 722e each containing washing solution, and through a dryer section 722f for drying of the photosensitive media. The individual prints of the images are then forwarded to a sorter 724 where the prints for each customer image order are collated into separate bins 44a-f, with each bin receiving an individual customer image order. It is to be understood that any number of desired bins 44a-f may be provided as appropriate for the apparatus 100 and sorted in accordance with any desired sorting criteria.

As is customary, a CPU (computer) 726 is provided for controlling operation of apparatus 100 and its various components. A user/operator interface 728 which includes a viewing screen 730 is also provided for allowing an operator to enter instructions for operation of apparatus 100 and monitor operation of the apparatus as is customarily done.

An appropriate computer-printing program is provided for controlling operation of IDM 706. The program is provided in an appropriate format which allows loading of the program into apparatus 100 which causes IDM 706 to perform the required steps. In particular, the computer program may be designed so that IDM 706 will first obtain and store a complete customer image order prior to printing. Appropriate enhancements algorithms, which have been pre-programmed into IDM 706, are applied to the customer image order so as to improve the overall aesthetic appearance of the images when printed. It is to be understood that any desired enhancements and/or corrections may be applied to the images. As an example, the process of producing a digitally enhanced image can comprise changing pixel values to maximize content that is captured either on film or digitally. As a further example, but not by way of limitation, the following are a few other enhancements that may be applied: contrast adjustment, red eye removal, color balance, removal of dust marks or scratches and sharpness adjustments. In addition, custom corrections, such as crop and zoom can be programmed or manually entered into digital printer. After the stored digital images are enhanced, they are forwarded to the printer for printing.

Therefore, as an example with respect to a minilab or whole lab (photofinisher), a customer image order can be provided and forwarded to the photofinisher. This typically takes the form of an undeveloped or developed roll of film which is sent to the photofinisher or images can be provided via the Internet or in some other type of digital format. If the film is undeveloped, the photofinisher will develop the film as is customarily done in the art. Once the film has been developed, it is passed onto apparatus 100 where the images of the customer image order are scanned and forwarded onto IDM 706 Appropriate image enhancement software programs, as previously discussed, are provided in IDM 706 for analyzing the images and providing appropriate enhancements/corrections automatically to the images. The images of the customer image order are then sent to the printer for printing.

In the embodiment discussed above, the images for printing can be obtained by scanning a developed roll of photosensitive film such as 35 mm or APS film. However, the present invention is not limited thereto. As illustrated in FIG. 10, the image data and the customer image order may be obtained from a variety of different sources (such as digital still cameras, the Internet, etc.), whereby a customer image order may be submitted for printing, including providing information of where the printed images are to be forwarded. For example, image input devices 740, 742, 744 may be provided wherein input device 740 may provide the images supplied on a CD, device 742 can be used to obtain images provided on a computer disk, and a communication modem 744 may be provided to receive images over the Internet, or from any other source that can forward digital images. Other digital input devices, such as a digital camera, may also be used.

In the illustrated embodiment, the apparatus 100 does the printing, however, the present invention is not so limited. For example, the images can be forwarded onto a different device for storage, printing and/or display. For example, IDM 706 may forward the images through modem 744 to a customer or other device for providing and/or storing images. That is, the system of the present invention can be adapted to send images remotely via the Internet to a customer's home computer, a remote printer or a selected location.

In the embodiment illustrated in FIG. 10, the individual components are illustrated as a single apparatus 10. However, the present invention is not so limited. In an alternative embodiment, items such as the scanner, the IDM 18, etc. can be separate individual components from apparatus 100. The operation and function of this alternative embodiment would be the same except that the individual components are discrete elements that can be separate from each other and connected by appropriate communication lines as is well known to those of ordinary skill in the art.

In the embodiment illustrated, the processing of the photosensitive media is done by apparatus 100. However, the present invention is not so limited. For example, the images may be printed on the web of photosensitive material 710 and forwarded in web form to a processor where the images are developed after which the developed web is forwarded onto a finishing station where the web is cut into individual prints and sorted by customer image order.

Figure 11:
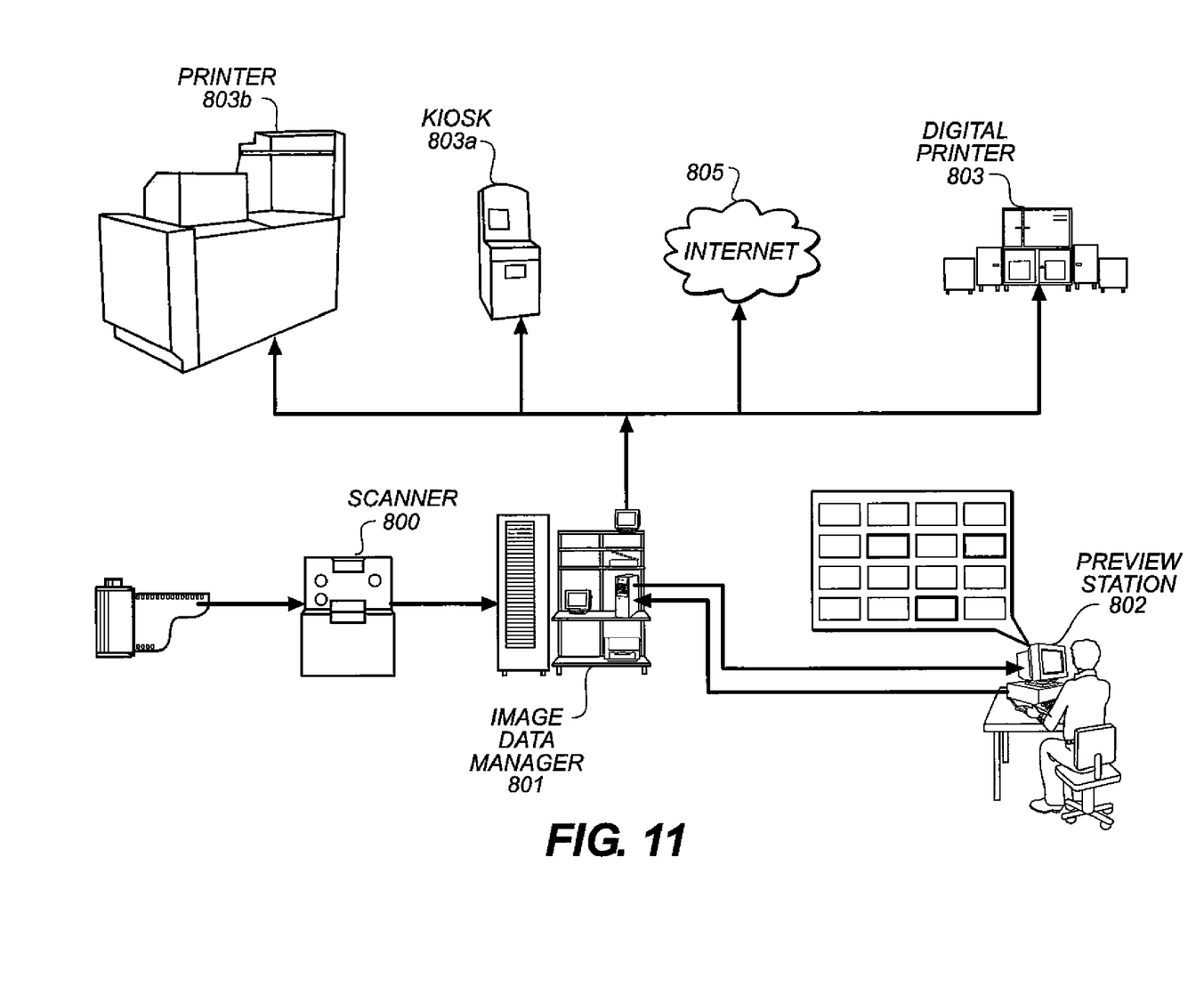
FIG. 11 schematically illustrates a processing or photofinishing system which can be used in the present invention.

The features of the present invention can also be practiced in a wholesale lab environment as illustrated in FIG. 11. As shown in FIG. 11, a customer order including film is scanned at a scanner 800. From there, the digital record of the images is processed at IDM 801, and optionally, an operator can preview images at a preview station 802. A digital printer 803 can be operationally associated with IDM 801 to produce service prints, index prints, etc. based on a customer order. As a further option, the images can be forwarded to a customer's home computer or some further remote location via an Internet connection 805. As a still further option, the images can be forwarded to a kiosk 803a operationally associated with IDM 801 via a kiosk connection or to a remote printer 803b. As a still further option, as previously noted, the kiosk can be a stand-alone customer operated and/or retail operator assisted kiosk such as the Kodak Picture Maker™ kiosk that can be directly accessed by the customer.

Regarding the present invention and the creation of a thumbnail border print, there are several options for practicing the invention utilizing a wholesale lab or minilab (photofinisher). In a first option, a customer can deliver the exposed film to the retailer for processing, and at that time the customer can check off a box on an instruction envelope indicating that they desire a thumbnail border print. In this case, the customer can make a decision of which print is to be selected for the thumbnail border print after the images are processed and return to the customer or optionally, the thumbnail border can be applied to every print in the order. For example, every print in the order can have a border of the other images on the same negative roll. It is noted that the selection of the thumbnail border print option can also be made after the customer receives his/her prints back from the retailer. After the customer makes his/her selection, the order is fulfilled by the service provider based on the customer's instructions to create the thumbnail border print. That is, the service provider creates a thumbnail border print by creating a border of thumbnail images around a main image selected by the customer. The thumbnail images could be those images selected by the customer from his/her order or images selected by the service provider based on the previously described criteria (for example, time stamp, image content, etc.). The print is then returned to the customer.

As a further option, the service provider can select a candidate for the image that is to be printed as a thumbnail border print and create a thumbnail border image for the selected image from the remaining images. The remaining images for the border images can be selected by the photofinisher or service provider based on the criteria described above, for example, time stamp, image content, etc. The thumbnail border print can then be returned to the customer with the rest of his/her order.

In a further embodiment, the service provider or retailer can provide a thumbnail border print as an enticement. More specifically, when an order is submitted for processing, the service provider and/or retailer can select a main image as a candidate for the thumbnail border print. This selection could be based on a review of the images to determine which image would be a good candidate for a thumbnail border image print. Such analysis could involve a selection of images with faces, a selection of images having landscape scenes, etc. The selection of the thumbnail border images may involve the selection of images from the customer order that most compliments the selected main image. Therefore, the service provider and/or retailer can then select images for the thumbnail border images utilizing, for example, the criteria described above and create the thumbnail border print. The thumbnail border print can then be given to the customer with the remainder of their order with advertising material detailing the thumbnail border print.

The invention has been described in detail with particular reference to certain preferred embodiments thereof, but it will be understood that variations and modifications can be effected within the spirit and scope of the invention.

The invention claimed is:

1. A method of creating a print, on print media, having a border, utilizing a digital printer, the method comprising the steps of:

obtaining a plurality of digital images captured with a digital camera;

selecting at least one of the plurality of digital camera captured digital images for printing by the digital printer on print media;

analyzing said plurality of digital camera captured digital images to determine which of said images are to be border images for the selected image, said analyzing step including reviewing said plurality of images to determine which of the images have time stamps that are closest to each other and designating said images with the closest time stamps as said border images;

resizing the border images as thumbnail images;

forming a border on print media around the selected image with the thumbnail images; and printing the selected image with the thumbnail image border on print media with the digital printer.

2. A method of creating a print, on print media, having a border, utilizing a digital printer, the method comprising the steps of:

obtaining a plurality of digital images captured with a digital camera;

selecting at least one of the plurality of digital camera captured digital images for printing by the digital printer on print media;

analyzing said plurality of digital camera captured digital images to determine which of said images are to be border images for the selected image, said analyzing step including analyzing said plurality of images to determine which of the images contain faces and designating the images that contain faces as said border images;

resizing the border images as thumbnail images;

forming a border on print media around the selected image with the thumbnail images; and printing the selected image with the thumbnail image border on print media with the digital printer.

3. A method of creating a print, on print media, having a border, utilizing a digital printer, the method comprising the steps of:

obtaining a plurality of digital images captured with a digital camera;

selecting at least one of the plurality of digital camera captured digital images for printing by the digital printer on print media;

analyzing said plurality of digital camera captured digital images to determine which of said images are to be border images for the selected image;

resizing the border images as thumbnail images;

analyzing the selected image for background or blank areas and placing the thumbnail images in said areas;

forming a border on print media around the selected image with the thumbnail images; and printing the selected image with the thumbnail image border on print media with the digital printer.

4. A method of creating a print, on print media, having a border, utilizing a digital printer, the method comprising the steps of:

obtaining a plurality of digital images captured with a digital camera;

selecting at least one of the plurality of digital camera captured digital images for printing by the digital printer on print media;

analyzing said plurality of digital camera captured digital images to determine which of said images are to be border images for the selected image, said analyzing step including determining if the selected image is in a folder, determining if there are further images in said folder, and designating the further images in said folder or in nearby folders as said border images;

resizing the border images as thumbnail images;

forming a border on print media around the selected image with the thumbnail images; and printing the selected image with the thumbnail image border on print media with the digital printer.

5. A method according to claim 1, wherein said printing step comprises printing the selected image with the thumbnail border on print media, wherein the digital printer is one of a minilab, a wholesale lab or a kiosk.

6. A print, on print media, comprising:

a main image obtained from a digital camera captured digital image;

a border surrounding said main image, said border having a plurality of reduced sized, user-selected images from digital camera captured digital images placed adjacent each other so as to form the border surrounding said main image; and wherein said main image is part of a customer order containing a plurality of images, and said reduced size images are images of said plurality of images that have time stamps that are closest to each other.

7. A print, on print media, comprising:

a main image obtained from a digital camera captured digital image;

a border surrounding said main image, said border having a plurality of reduced sized, user-selected images from digital camera captured digital images placed adjacent each other so as to form the border surrounding said main image; and wherein said main image is part of a customer order containing a plurality of images, and said reduced size images are images of said plurality of images that contain faces.

* * * * *